Patented Feb. 11, 1930

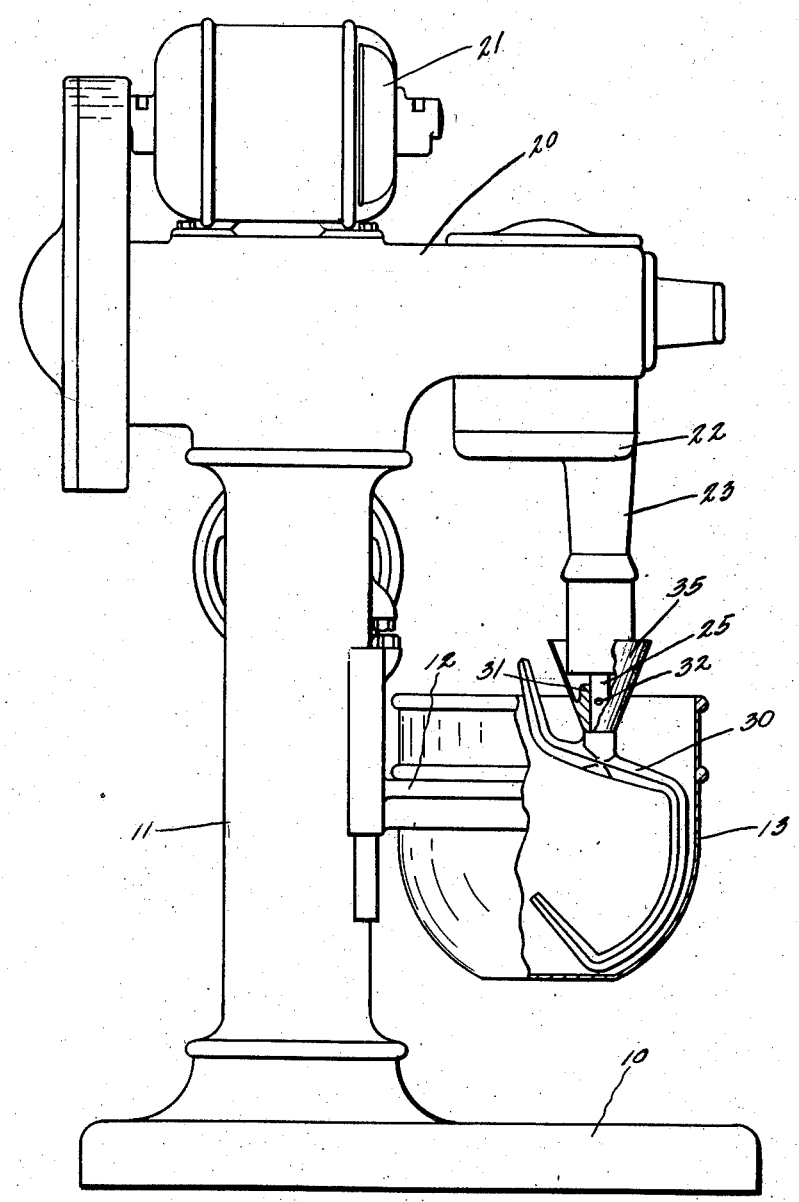

1,746,384

UNITED STATES PATENT OFFICE

ARTHUR R. DE LONG, OF MENASHA, WISCONSIN, ASSIGNOR TO THE HOBART MANUFACTURING COMPANY, OF TROY, OHIO, A CORPORATION OF OHIO

APPARATUS FOR TREATING FOODSTUFFS

Application filed October 4, 1926. Serial No. 139,418.

This invention relates to mixing machines, and particularly to machines for mixing foodstuffs such as cake dough, bread dough and the like.

One of the principal objects of this invention is to provide an efficient and effectively operating mixing machine of this character, which is simple in construction, reliable in operation, having an upwardly outwardly flaring portion on the beater which effectively prevents creeping of the dough, and one which is readily maintained in operating condition with a minimum of attention.

Other objects and advantages of this invention will be apparent from the following description when taken in connection with the accompanying drawing.

The single figure of the drawing is a side elevation of a mixing machine with a beater or stirrer attached, and having certain parts broken away and in section to more clearly illustrate the invention.

In the embodiment of the invention illustrated herein, a mixing machine is shown comprising a base 10 carrying a standard 11, upon which is mounted a bowl-supporting ring 12 carrying a suitable mixing bowl 13. Positioned at the upper end of the standard 11 is a casing 20, housing suitable gear transmission, driven by a motor 21. Rotatably mounted upon the portion of the casing 20 which overhangs the bowl is a rotary head 22 which is driven by the motor through the gear transmission. Rotatably mounted within a downward extension 23 of the head 22 and also operatively connected to the gear transmission so as to be rotated thereby within the head 22 is a shaft 25 the lower end of which is formed to detachably receive a beater, stirrer or other tool, for operating upon dough, or other material within the bowl. The construction and arrangement of these parts is such that a planetary motion is imparted, the shaft 25 rotating on its own axis, and at the same time moving bodily through a circular path as the head 22 rotates. The driving mechanism and gearing for imparting this motion to the driven shaft 25 from the driving motor 21 is not illustrated, as such mechanism is well known in the art, and any suitable driving connections between the motor 21 and the driven shaft 25 may be used to impart motion thereto.

In the drawing the tool connected to the shaft is shown as a beater or stirrer such as is used for mixing dough for cake or bread making. This beater is indicated generally at 30, and may be of any suitable desired shape other than that shown, so long as it fits within the mixing bowl 13, and upon operation of the shaft 25 serves to rotate and revolve within the mixing bowl to effectively stir up and mix the material contained therein. The beater is detachably mounted upon the shaft 25 in any suitable manner. As shown the beater is provided with a hub portion having a socket 31 which receives the end of the shaft 25, a suitable pin 32 which cooperates with a bayonet groove or slot in the socket, not shown, serving to detachably connect these parts.

In mixing foodstuffs of the character of bread dough, cake dough, and other materials of a similar sticky or doughy nature, it is found that such materials sometimes tend to wind around and creep up the beater and onto the shaft 25, and to get into the socket connection between the shaft 25 and the beater. This is objectionable from the standpoint of rendering ready attachment of the beater difficult due to incrustations of material within the socket portion of the beater and on the shaft, which makes for additional labor in keeping the parts clean. Also when this occurs the entire batch of dough being mixed may be spoiled due to the fact that the attaching member and shaft are usually oily and grimy, and the entire batch of dough may thus be so contaminated as to be useless.

In order to prevent this objectionable winding around and creeping of the material being mixed and to provide a device which is reliable and readily maintained with a minimum of attention in operative condition, there is provided according to this invention a cone-shaped member 35 preferably carried by the beater just below the attaching socket member. This cone-shaped member is preferably made hollow to enclose the end of the shaft and the lower end of the extention 23. By means of this arrangement a cone-shaped member of considerable length may be used without increasing the normal overall height of the machine. As shown, the length of the frusto-conical member 35 substantially exceeds its minimum diameter and its wall is flared outwardly at such an angle that tendency of material to creep up said wall as it is wound about the cone is overcome. This is accomplished by making the angle of this cone-shaped member sufficiently large and so coordinated with its length that the creeping of the dough beyond a certain point is effectively overcome. The angle necessary for overcoming this tendency to creep for any particular length of cone may, for purposes of simpler description, be called the "angle of non-creeping". In practice for the mixing of cake and bread dough an angle of inclination of 30° from the axis of rotation of the beater has been found very satisfactory as this permits the use of a cone which is not excessively long and not of excessively great diameter at its upper end, but this angle may be varied over a considerable range, depending on the material to be treated. But the angle above mentioned will give very satisfactory results with the materials ordinarily treated in such a mixer.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a dough mixing machine, a mixing bowl, a depending beater adapted for mixing material extending into said bowl, means for actuating said beater in a planetary manner comprising a depending driven shaft, means for driving said shaft, means for attaching said beater to said shaft and means carried by said beater including a frustro-conical member between the beater and said shaft of substantial length for preventing creeping of the material being treated onto said shaft, said frustro-conical member and the bowl being considerably spaced apart so that dough will not bridge the gap therebetween, said member being flared outwardly and upwardly with respect to the axis of rotation of the beater at an angle of non-creeping for the material being treated so that the material is prevented from creeping up beyond the top of said frustro-conical member.

2. In a dough mixing machine, a mixing bowl, a substantially vertical driven shaft, means for actuating said shaft and for imparting a planetary motion thereto, and a beater attached to said shaft and adapted to move in said bowl within material to be mixed, said beater and shaft being provided with an upwardly and outwardly flaring frustro-conical portion arranged at an angle of non-creeping for the material being mixed and considerably spaced away from the bowl so that dough will not bridge the gap therebetween, the said portion having a length which is substantially greater than its minimum diameter so that material being mixed is prevented from creeping up said beater and shaft beyond said cone-shaped portion.

3. For use in a dough mixing machine having a mixing bowl, a substantially vertical driven mixing shaft above said bowl and means for driving said shaft, a beater adapted to be attached to said shaft and to move in said bowl within material to be mixed, said beater being provided adjacent its upper end with an outwardly and upwardly flaring portion thereon, the length of said flaring portion and the degree of flare being coordinated to prevent the creeping of the material being mixed above said portion, said flaring portion and the bowl being considerably spaced apart so that dough will not bridge the gap therebetween.

4. For use in a dough mixing machine having a substantially vertically depending driven mixing shaft and means for driving said shaft, a beater adapted to be attached to said shaft and to move within material to be mixed, said beater including a frustro-conical socket portion adapted to receive the end of said shaft in operative engagement, said portion being tapered outwardly and upwarly at an angle of non-creeping for material being mixed, and having a substantial length which is coordinated with the degree of taper of said portion to thereby prevent the creeping of material above said portion.

In testimony whereof I hereto affix my signature.

ARTHUR R. DE LONG.